United States Patent [19]

Merrion

[11] Patent Number: 5,694,659
[45] Date of Patent: Dec. 9, 1997

[54] EYEWEAR LENS WIPING DEVICE

[76] Inventor: T. Greg Merrion, 504 McDonald Rd., Farmington, N. Mex. 87401

[21] Appl. No.: 791,253

[22] Filed: Jan. 30, 1997

Related U.S. Application Data

[63] Continuation-in-part of Ser. No. 383,364, Feb. 3, 1995, abandoned.

[51] Int. Cl.⁶ .................................................... G02C 13/00
[52] U.S. Cl. ........................ 15/214; 15/104.93; 15/104.94; 15/227
[58] Field of Search ......................... 15/104.93, 104.94, 15/208, 209.1, 214, 223, 225, 227

[56] References Cited

U.S. PATENT DOCUMENTS

| | | |
|---|---|---|
| 399,450 | 3/1889 | Thorpe . |
| 922,108 | 5/1909 | Dunn . |
| 946,436 | 1/1910 | Haussmann . |
| 968,924 | 8/1910 | Enge . |
| 1,150,129 | 8/1915 | Lee ............................................. 15/227 |
| 1,207,276 | 12/1916 | Cogswell .................................. 15/227 |
| 1,343,466 | 6/1920 | Mork ......................................... 15/227 |
| 1,607,366 | 11/1926 | Reitzes . |
| 1,702,172 | 2/1929 | Rennie ..................................... 15/210.1 |
| 1,755,113 | 4/1930 | Grom . |
| 1,994,425 | 3/1935 | Weller . |
| 2,204,947 | 6/1940 | Apfelbaum . |
| 2,233,746 | 3/1941 | Potter ........................................ 15/209.1 |
| 2,323,098 | 6/1943 | Mintzes et al. .......................... 15/209.1 |
| 2,529,163 | 11/1950 | Knight ....................................... 15/209.1 |
| 2,554,630 | 5/1951 | Miller ........................................ 15/214 |
| 2,754,532 | 7/1956 | Kanehc et al. ........................... 15/209.1 |
| 3,048,878 | 8/1962 | Grey et al. . |
| 3,406,658 | 10/1968 | Neugart . |
| 3,441,971 | 5/1969 | Gowdy . |
| 3,647,059 | 3/1972 | Humphreys . |
| 3,760,461 | 9/1973 | Wright . |
| 4,403,366 | 9/1983 | Lucke ........................................ 15/209.1 |
| 4,516,616 | 5/1985 | Fesler . |
| 4,761,849 | 8/1988 | Taylor ....................................... 15/227 |
| 4,854,449 | 8/1989 | Fitzhugh . |
| 4,953,603 | 9/1990 | Holden . |
| 5,000,204 | 3/1991 | Smith ........................................ 134/6 |
| 5,012,543 | 5/1991 | Lewis, Sr. ................................ 15/209.1 |
| 5,083,661 | 1/1992 | Burwell . |
| 5,131,112 | 7/1992 | Gervini ..................................... 15/209.1 |
| 5,147,703 | 9/1992 | Provost et al. ........................... 428/82 |
| 5,161,683 | 11/1992 | Smith . |

FOREIGN PATENT DOCUMENTS

| | | | |
|---|---|---|---|
| 728794 | 4/1932 | France ...................................... | 15/214 |
| 984095 | 2/1951 | France ...................................... | 15/214 |
| 245535 | 2/1926 | Italy .......................................... | 15/227 |
| 50-18426 | 6/1975 | Japan . | |
| 5567 | of 1904 | United Kingdom ..................... | 15/214 |
| 304989 | 1/1929 | United Kingdom . | |

*Primary Examiner*—Mark Spisich
*Attorney, Agent, or Firm*—Kenton L. Freudenberg; Maxwell C. Freudenberg

[57] ABSTRACT

A small compact pocket-size flexible device for wiping eyewear lenses. The device includes a sheet-like layer of a soft non-abrasive lens-wiping flexible material which is folded within an outer flexible layer of protective material to completely enclose or envelop and protect the wiping layer against water, dirt or other environmental contaminants while being carried by a sportsperson. The folded wiping device is flat and flexible and easily and unobtrusively carried in a pocket of a sportswear garment. The device may be removably attached to the exterior of such garment by a strap extension which may be part of the device which keeps it in its folded configuration when not used for wiping. The soft lens-wiping sheet material may be treated with a cleaning or defogging composition.

25 Claims, 9 Drawing Sheets

EYEWEAR LENS WIPING DEVICE

This application is a continuation-in-part of prior application Ser. No. 08/383,364, filed Feb. 3, 1995, now abandoned.

FIELD OF THE INVENTION

This invention relates to an eyewear lens cleaner which is pocket-sized when folded, or closely wrapped, in a weather and dirt resistant protective cover.

BACKGROUND OF THE INVENTION

In many sporting activities participants find need to use some form of eyewear for eye protection and/or sight correction. Sweat, rain, dirt and other forms of contamination often necessitate that the user wipe dry or clean the lenses of eyewear for sports activities to maintain optimum vision for the user. Lenses of such eyewear are typically made of plastic material having a low resistance to abrasion. In many sports, such as biking, golfing, running and skiing, the participant carries some form of wiping device such as a towel, small cloth or other soft flexible cleansing member. Sometimes the member is merely folded and placed in a pocket like a handkerchief. Sometimes such a member is attached to a garment, or to apparatus such as a bicycle or golf cart, by a clip or chain. For protection of the wiping member against contaminants the member may even be covered by a plastic sheet or the like or placed in a container such as a flexible envelope or pouch or placed in a rigid container from which it is readily removable for use. However, such devices known to the present inventor lack convenience of use achieved by the present invention.

Rigid containers are apt to be uncomfortable when required to be carried in a pocket or when dangling from a garment, particularly in the event of a fall or accident when the container is forced against a body part of the user. Rigid containers and metal carrying chains also pose a risk of abrasive or scratching contact with a lens. Some containers require complete separation of the wiping member from the container leaving two separate pieces to be accounted for during use.

Flexible envelope or pouch containers require manipulation for extraction or replacement of the wiping member by the user which often is awkward or taxing, particularly for a skier whose hands are very cold.

SUMMARY OF THE INVENTION

The invention provides a flexible wiper device for cleaning an eyewear lens and having a folded or furled compact configuration and being of a size to be readily carried in a pocket of sportswear clothing or having an attaching portion to enable it to be hung on a garment such as a loop or zipper pull. The wiper device when unfolded has two opposite surfaces, a first of said surfaces being of a soft material for wiping the lens, the second of said surfaces completely enclosing the first surface when the device is in its folded configuration to protect the entire second surface against environmental conditions which could impair its capability of cleaning the lenses. The device has manually releasable means to secure its attaching portion to sportswear clothing. The device is further provided with means to retain it in its furled or folded compact configuration comprising a manually releasable fastener secured to said second surface. This fastener may be in the form of a strap having a binding portion wrapped around the folded device and having an extension portion of the strap attached to a user's sportswear clothing to prevent inadvertent unfolding of the device, or loss by dropping, during sporting activities of the user.

Among the objects achieved by the present invention is to provide a small pocket-size cleaning device for eyewear lenses which can be conveniently carried by a sportsperson and be readily accessed for use with minimum likelihood of losing the device by accidentally dropping it, for example when riding a ski-lift.

Another object of the invention is to provide a low cost lens cleaning device with a porous absorbent non-abrasive cleaning or wiping surface which is completely enwrapped or enfurled by a protective cover integrally attached thereto, the cover being preferably at least water resistant.

Another object of the invention is to provide a lens cleaning device with means providing finger receiving parts which keep opposed cleaning portions of the device located between opposing fingers of a hand to enable application of rubbing pressure to opposite sides of a lens.

Another object of the invention is to provide a lens cleaning device which is readily attached to hang from a garment or the like and which has no hard or metallic parts which might cause damaging abrasion of a lens surface if in contact with the lens, the attaching means preferably enabling the device to be unfurled for use while still remaining secured to the garment.

Another object of the invention is to provide a compact pocket-size lens cleaning device with an absorbent surface which is itself cleanable by washing and which has a lens cleaning surface which can be impregnated by the user with any desired lens-treating compound such as for cleaning or defogging a lens.

Another object of the invention is to provide a compact flexible lens cleaning device which can be retained in a folded or wrapped configuration by binding means and which is unobtrusive when kept in a pocket or attached to a garment and minimizes any possible injury to a user who might fall upon the device.

DESCRIPTION OF THE PREFERRED EMBODIMENT

Figure 1:
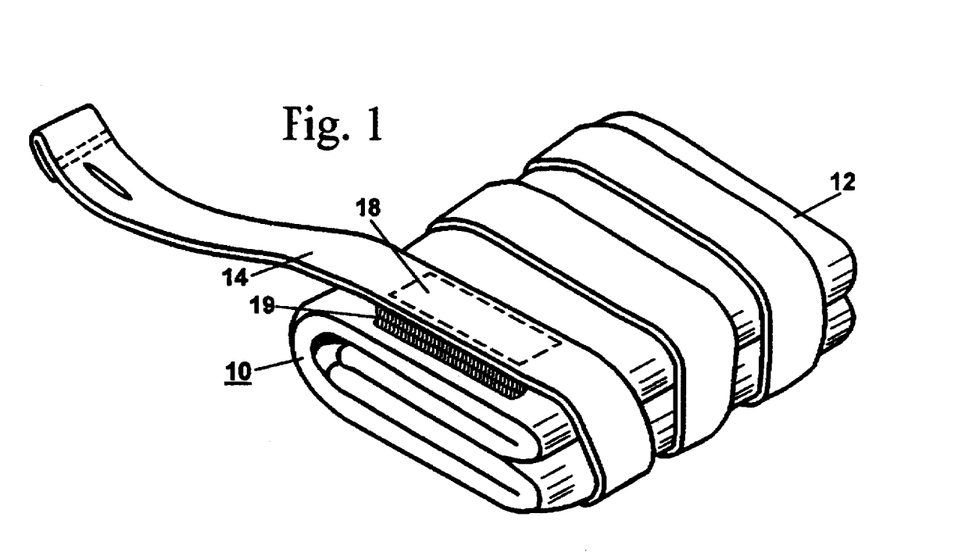
FIG. 1 is a view of a compactly configured folded lens wiping device showing a strap wrapped around the device to fasten it against unfolding.
Figure 2:
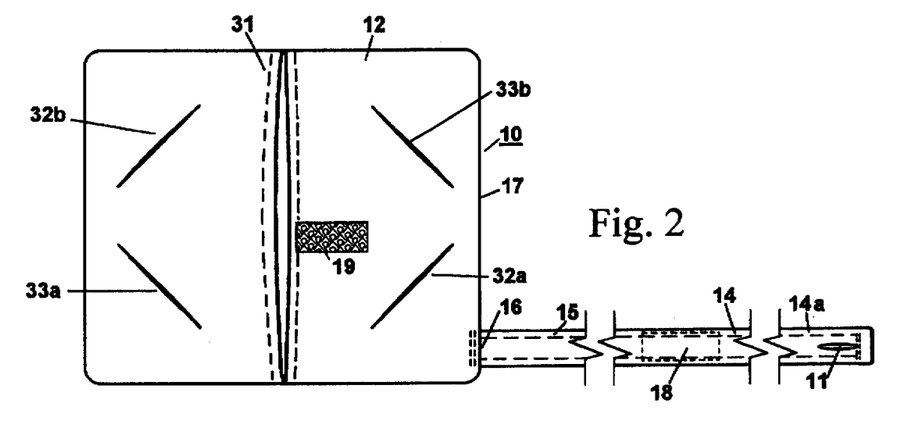
FIG. 2 is a view of the device of FIG. 1 unfolded to a flat configuration and showing the protective cover side of the device with the fastening strap extending outwardly from an edge of the device.
Figure 3:
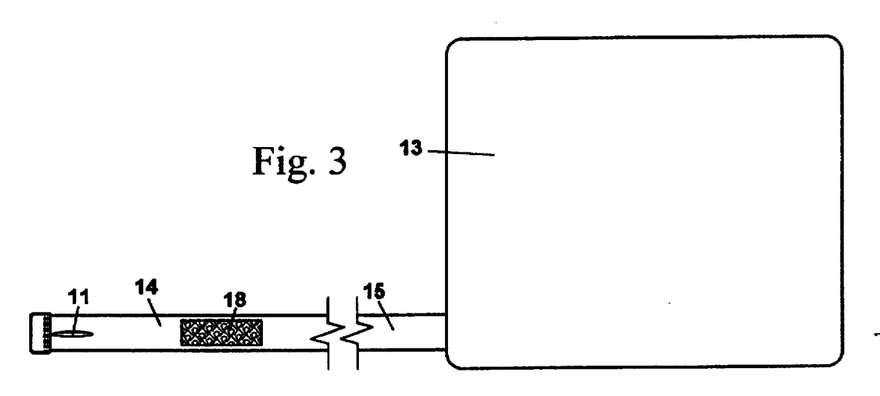
FIG. 3 is a view similar to FIG. 2, but showing the unobstructed opposite or wiping surface side of the device.

Referring to FIG. 1, a folded eyewear lens wiping device 10 appears in a relatively flat compact configuration in which the principal outer surface of the device is formed by a folded protective layer 12 of flexible material which completely encloses a coextensive soft non-abrasive wiping layer 13 forming the opposite principal outer surface of the unfolded wiping device as seen in FIG. 3. The device 10 is kept from unfolding when carried by a sportsperson by means of a manually releasable strap 14 having one portion 15 wrapped around the folded structure of the device. The device 10 may be suspended at the exterior of a separate object spaced from the folded configuration of the device by means of a strap extension 14a as in FIG. 2 described below to facilitate safer carrying of the folded wiping device when it is not being used for wiping. The strap portion 15 has a first end 16 secured as by stitching in a seam or binding 17 which secures the peripheries of the coextensive layers 12 and 13 together around the periphery of the unfolded device as seen in FIG. 2. The other end of the strap portion 15 has secured thereto the hook part 18 of a set of well known hook/loop fastener members, the other loop part 19 of the fastener set being secured to the outer surface of the protective cover layer 12 near the center of this layer as described below.

Figure 4:
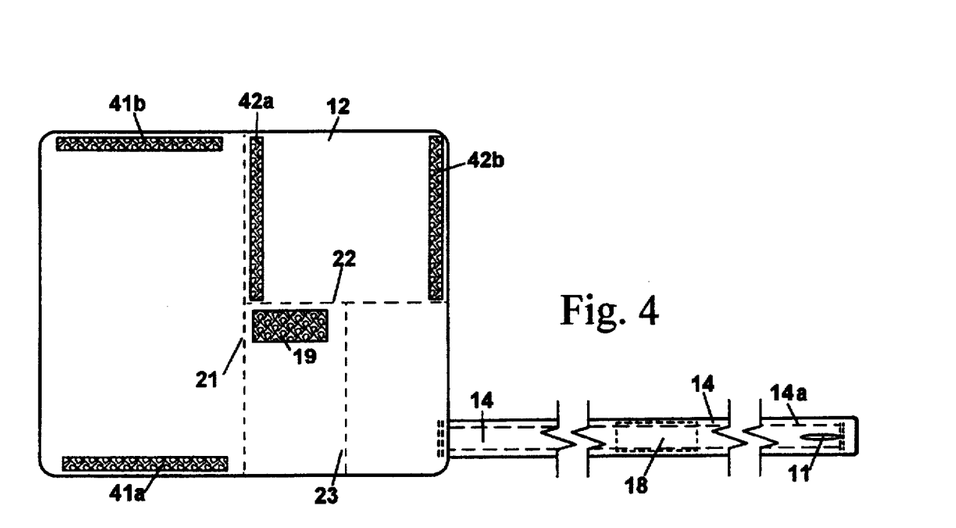
FIG. 4 is a view similar to FIG. 2, without the pocket access slits and with dashed lines indicating location of folds and further illustrating alternative means for fastening the device in its folded configuration.

Although FIG. 4 illustrates an alternative embodiment, reference thereto is useful to explain the preferred method of folding the wiping device of either FIGS. 2 or 4. Keeping the protective cover on the outside when folding, an initial folding in half is made along the central imaginary fold line 21. A second folding in half is then made along the line 22 keeping the right half of the protective cover in FIGS. 2 and 4 at the outside. A third folding in half is then made along the line 23 in the middle of the lower right quadrant of the protective cover in FIG. 4, keeping this quadrant of the protective cover in FIGS. 2 and 4 at the outside of the folded device. The fastener loop part 19 described above is secured in FIG. 2 to the cover layer 12 at the lower upper left of the lower right quadrant just described. These three folds reduce the outer area of one side of the folded device by a factor of eight to provide a significant reduction in a real size from that shown in FIGS. 2 and 4. The thickness is increased by a factor of eight, but this is of much less significance due to the thinness of the protective cover layer 12 and the wiping layer 13. After folding the device as described and wrapping the strap portion 15 around the folded device, the strap becomes a manually releasable binding member or fastening means to keep the device folded by manually pressing the fastener parts 18 and 19 together.

Although the three orthogonally, i.e. perpendicularly, related folds just described for FIGS. 2 and 4 are adequate for a 4.75 by 6 inch unfolded rectangular device as seen in FIGS. 2 and 4, the use of even more such folds is contemplated for devices of larger unfolded dimensions, but at least three folds is deemed practical for useful sizes of wiping devices. Although it is easiest to fold a flat area in half, it is within the spirit of this invention that other folding, for example in thirds, could be made as part of the multiple orthogonally related folds. Also initial folding may be with one or more folds along one direction followed by one or more folds or even compact rolling of the device in another direction to its desired compact configuration in which the wiping surface is completely enclosed and protected by a surface that is dirt resistant and at least resistant to water. Even with additional fold as just described, manually releasable fastening means as illustrated in FIGS. 2 and 4 may be appropriately placed and used to retain the wiping device in its compact folded configuration.

In the preferred embodiment of FIGS. 1–3 the protective layer 12 is provided with several slits providing finger engageable means which define openings for several pockets for receiving or engaging the thumb and one or more of the other fingers of one hand of the user of the wiping device.

Figure 5:
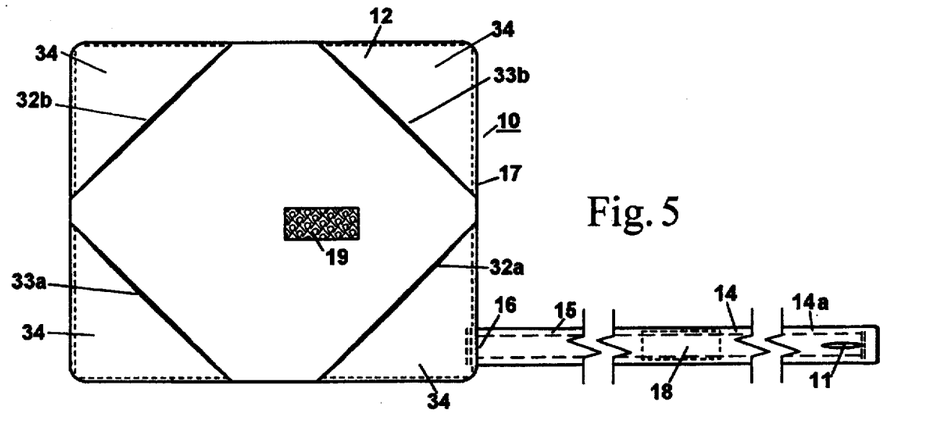
FIG. 5 is a view similar to FIG. 2, showing an embodiment in which the finger pockets are constructed from an additional layer material attached to the protective cover.
Figure 6:
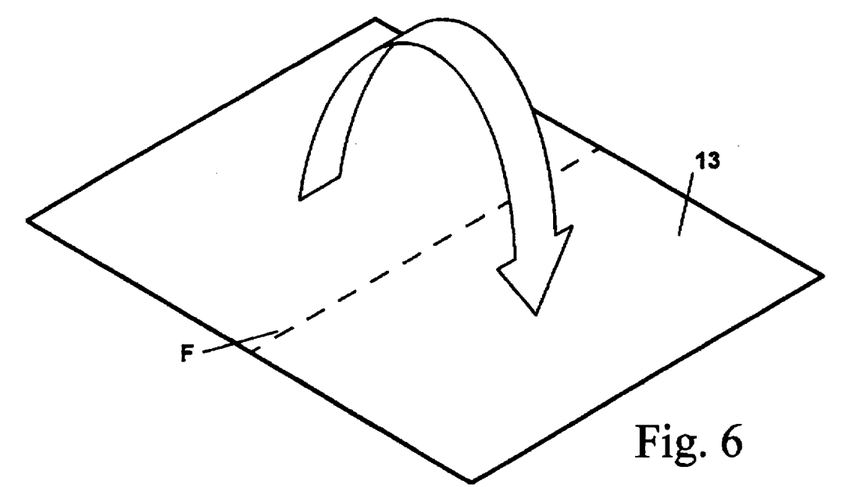
FIGS. 6–12 are perspective views showing a sequence of folding a lens wiping device as described herein so that the protective cover layer may completely envelope the wiping surface layer so as to leave no portion of the wiping layer exposed.
Figure 13:
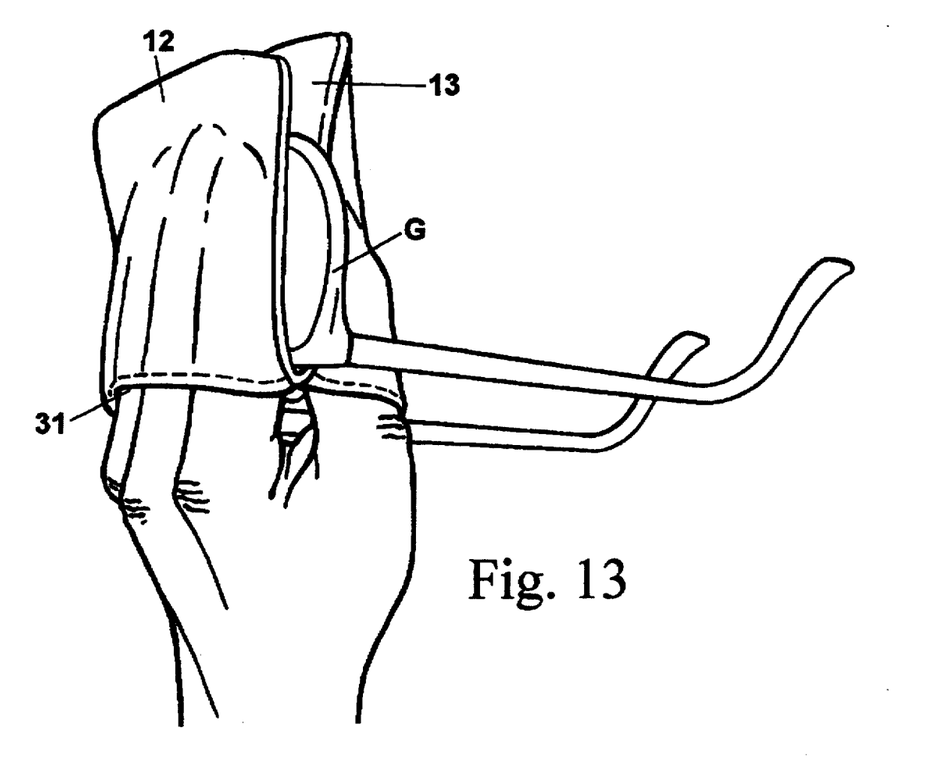
FIG. 13 is a perspective view showing the manner in which the lens wiping device may be used to simultaneously wipe both sides of the lenses of ordinary eyeglasses and further shows how a central slit forms pockets which facilitate the engagement of fingers and thumb for use of the device.

A central slit 31 across the width or minor dimension of the rectangular shape of the device as seen in FIG. 2 forms the opening for a set of two pockets between the cover layer 12 and the wiping layer 13. The pockets open toward each other as arranged in FIG. 2 and when the device 10 is folded generally along the slit 31 a thumb may be placed in one pocket and one or more of the other fingers can be placed in the opposing pocket to enable the hand to manipulate the device so that portions of the wiping surface of layer 13 can be placed on opposite side of a lens when the layer folds around the edge of the lens. In this manner slight finger pressure can be applied to press the wiping surface portions against the lens during a lens wiping operation. This use is shown in FIG. 13, where the device is used to wipe both sides of the lenses of ordinary eyeglasses G. FIG. 2 also has two additional sets of spaced multiple pockets accessible by means of the sets of slits 32a–32b and 33a–33b, either of which sets accommodate, for example, a thumb and index finger of one hand. Each of the slits 32a, 32b, 33a and 33b extends across a corner of the rectangular shape of the device at an angle of approximately 45° to the sides of the rectangle or generally perpendicular to the respective diagonal of the rectangle from the respective corner. Because the slits of each set 32a–32b or 33a–33b define openings into pockets near the corners of the wiping surface, a maximum extent of the wiping surface is provided between the spaced slits of each set enabling manipulation of the wiping surface around the edge of an eyewear lens to reach opposed lens surface portions. This may be particularly useful when it is desired to reach opposite surfaces of the lens of, for example, ski goggles which have frames of large cross section for sealing against the face around the periphery of the lens. While providing slits within the protective layer allows relatively simple and economical fabrication of the present invention, such slits may compromise the integrity of the protective layer, particularly where a barrier to the entry of moisture is desired. Accordingly, an alternative means of positively manually engaging the device may be made by means of spaced finger engageable opposed opening means such as loops or pockets of separate material attached to the surface of the protective layer. An example of this alternative construction is illustrated in FIG. 5 in which manually engageable pockets 34 are formed from separate pieces of fabric or similar suitable material attached to the protective layer to overlie the corners of the device and provide pockets with openings 32a', 32b', 33a' and 33b' which correspond to the slits of the embodiment previously described. In this illustrated alterative embodiment the central slit 31 in the protective layer as in FIG. 2 is omitted. In lieu of full pockets, a simple finger engageable loop of fabric or elastic may be provided.

The dimensions of the unfolded device as in FIGS. 2 and 4 are 4.75 inches wide and 6 inches long, but may be made larger, particularly if necessary to allow opposed cleaning surface portions to engage and be simultaneously rubbed against opposed surfaces of a lens on the aforementioned ski goggles having large frame portions.

The edges of slits 31, 32a, 32b, 33a and 33b, or openings 32a', 32b', 33a' and 33b', may each be finished with an ordinary buttonhole stitch if the layer 12 is made of sewable fabric material. However it is within the scope of this invention that the protective layer be made of a thin tough flexible plastic sheet which may have plastic or other reinforcement at the edges of the slits provided in any suitable manner.

Figure 4A:
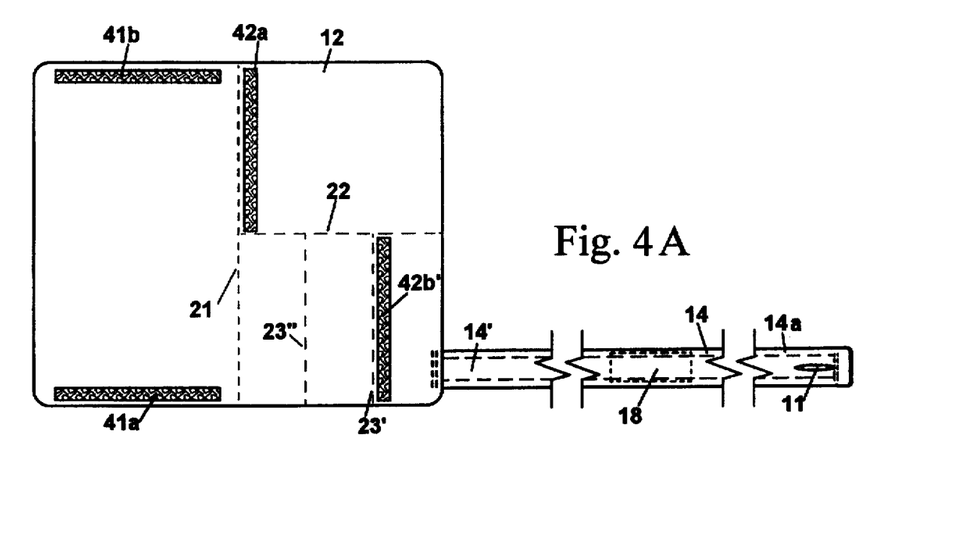
FIG. 4A is a view similar to FIG. 4 illustrating a modified means to hold the device in its folded configuration.

In the embodiment of FIG. 4, the folded portions of the device structure, which are formed by the folds orthogonally related at lines 21, 22 and 23 as described above, may be kept from unfolding by manually releasable fastening means in the form of narrow sets of mating hook/loop fastener members secured to the exposed surface of the protective layer 12 at the edges of the abutting folded surfaces to hold the surfaces together. The fastener members of set 41a–41b are located where they can be manually pressed and secured together upon making the second fold at line 22. Similarly, the fastener members of set 42a–42b are located where they can be pressed together upon making the third fold at line 23. An alternative location for the fastener member 42b is shown at 42b' in FIG. 4A to permit the last folding of the device to be made in thirds along fold lines 23' and 23" instead of the half fold along line 23. Such folding in thirds is made by first folding along line 23' with the strap 14 folded, or attached, to extend from the top of the device as oriented in FIG. 4A. Thereupon the last fold is made at fold line 23" whereupon the fastener strips 42a and 42b' can be manually pressed together to tightly wrap and retain the protective cover layer 12 as a complete enclosure to protect the inner-wrapped complimentary wiping layer 13.

The sequence of folding along each fold line F as shown in FIGS. 6–12 provides that the protective cover layer 12 may completely envelope the wiping surface layer 13 so as to leave no portion or edge of the wiping layer exposed. Such a folding pattern insures that the wiping layer may remain shielded against contamination by moisture, dirt or dust. Upon folding, the device may be secured into its compact form by mating hook and loop fastener strips 20a and 20b which are affixed to the protective layer 12.

Figure 7:
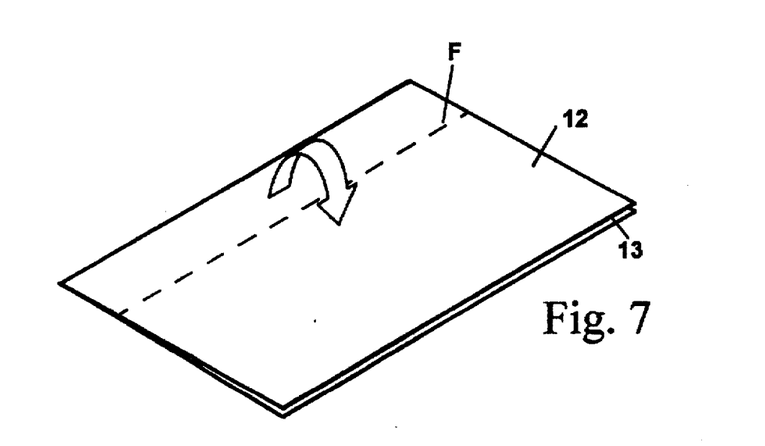
Figure 8:
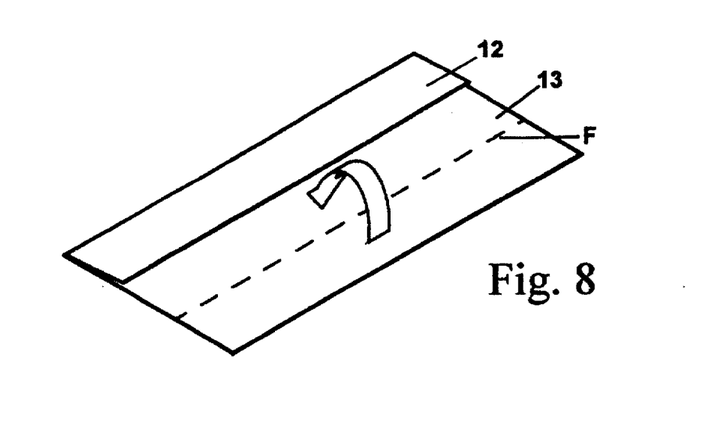
Figure 9:
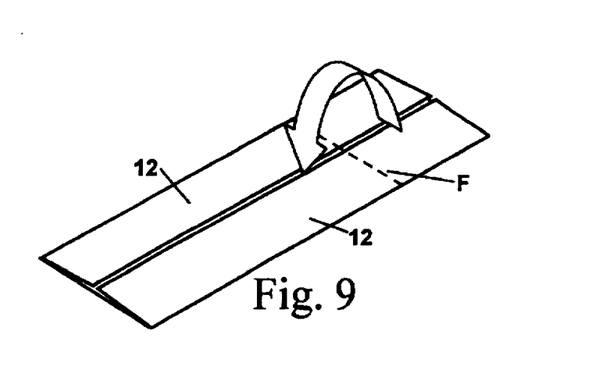
Figure 10:
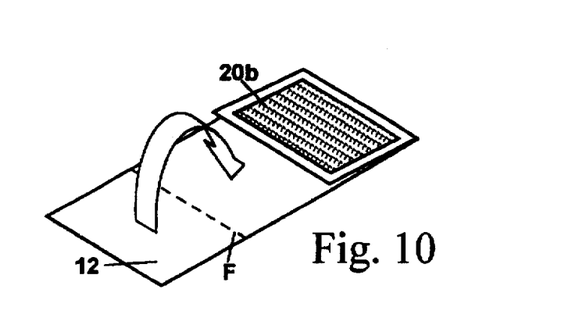
Figure 11:
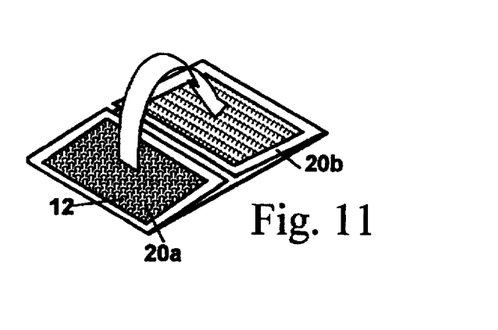
Figure 12:
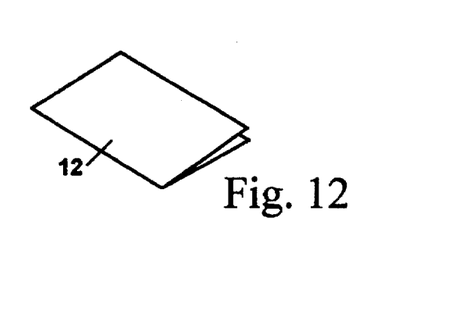

The two parallel folds F in FIGS. 7–8 reduce the area of the rectangular unfurled device by half. Similarly, the two parallel folds F in FIGS. 9–11 again reduce the area of the rectangular unfurled device by half. Lastly, the final fold or furl as in FIG. 12 again reduces the area of the rectangular unfurled device by half. In this final folded configuration none of the edges or surfaces of the wiping layer 13 of the unfurled device are exposed to environmental contamination.

Figure 14:
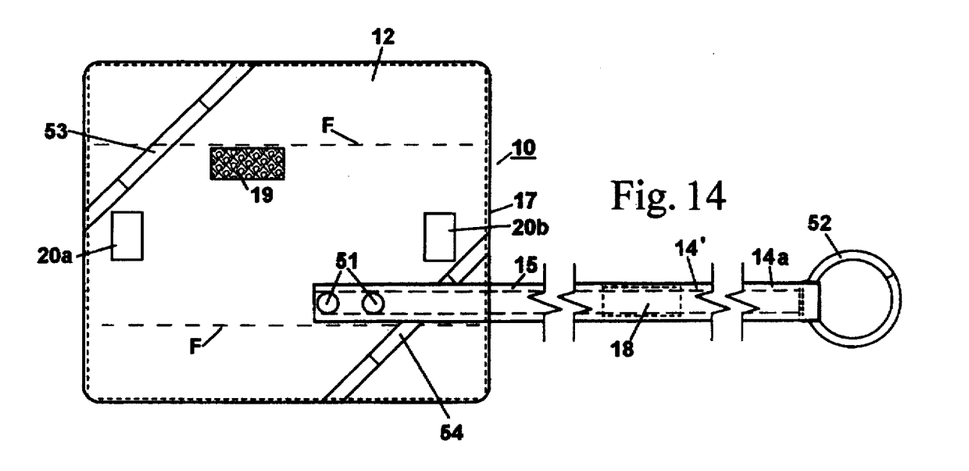
FIG. 14 is a view of the outer protective side of an unfurled device like that of FIG. 7 showing attachment means for an elongated strap and showing finger engageable elastic bands at opposite corners of the device.
Figure 15:
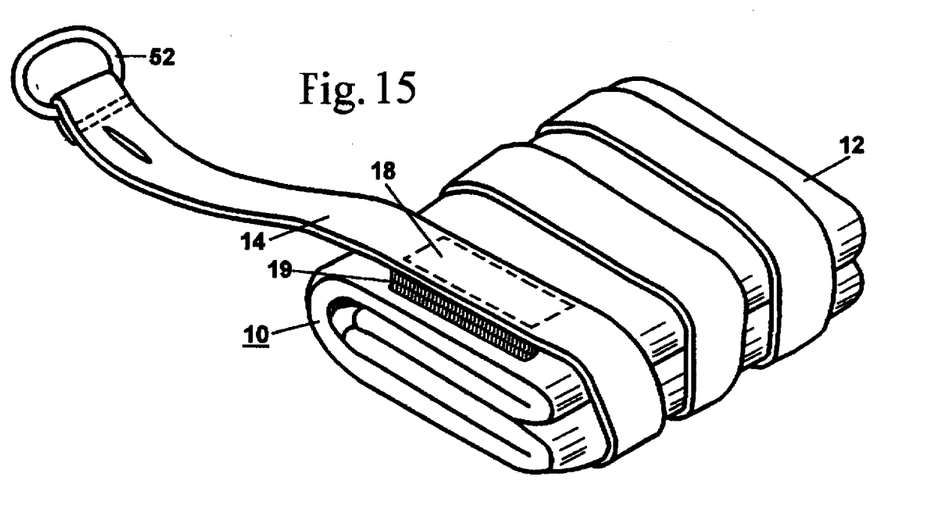
FIG. 15 is a view similar to FIG. 1 showing the device of FIG. 14 in its unfolded configuration and with the strap stowed by wrapping it about the device.

As seen in FIG. 14, a configuration of the wiping device may be made with the protective layer 12 coextensive with, but of different material from, the wiping layer 13 not shown in FIG. 14. These layers are stitched together around their periphery at a seam 17 in the manner as in FIGS. 2 and 5. The protective layer surface of such a device in its unfolded configuration is shown in FIG. 14 with an elongated strap 14', similar to previously described straps 14, detachably secured to the outer surface of the protected layer 12 by a pair of plastic button-type snap fasteners 51 aligned parallel to the two initial fold lines F of FIG. 14. Upon folding the device in the manner of FIGS. 7–12, the strap can be stowed by wrapping it around the folded configuration and releasably securing a fastening portion 18 thereof near a ring 52 at the other end of the strap to a mating fastening portion 19 on the protective layer 12 to achieve a folded configuration shown in FIG. 15 which is like that of FIG. 1. These fastening means 18–19 may be hook/loop fasteners as previously described.

As seen in FIG. 14 the outer protective side of the unfurled device has a pair of narrow elastic parallel strips extending across diagonally opposite corners of the rectangular device. Opposite ends of each strip are stitched or otherwise secured to the protective layer 12 and a central portion of each strip, normally lying parallel to and along the layer 12 may be distended to form opposed openings for insertion and elastic gripping of a thumb and finger of one hand under these central portions to facilitate applying pressure for simultaneously wiping opposite surfaces of a lens.

In the illustrated embodiments of FIGS. 1–5 and 14, a soft non-abrasive elongated flexible strap is provided as a means for releasably attaching the folded wiping device to the exterior of a separate object such as a loop around the user's neck, a garment surface, a garment loop which is often provided for lift ticket attachment, a zipper pull, keychain, golf bag or cart, belt, vehicle part (handlebar or dashboard knob). In FIGS. 1–5 and 14 the attachment strap is the strap extension 14a which extends beyond the portion 15 of strap 14 which holds the wiping device in its folded configuration. When the wiping device of FIGS. 1–3 is unfolded for use the combined lengths of portion 15 and extension 14a of strap 14 provide a convenient lanyard permitting wiping use of the device 10 without having to detach it from, for example, a garment of the user and thus avoiding risk of loss when riding a ski lift. An attaching strap 14' of FIG. 4A may be provided without the wrapping function of portion 15 of strap 14 as in FIGS. 2 and 5. The length of the attaching straps of FIGS. 2 or 4 may be selected to enable the user to attach the free strap end where desired and to even permit the folded device to be kept within a pocket while still attached to a garment. Preferably the free strap end is provided with one or more apertures 11 similar to buttonholes therealong to select an appropriate length to facilitate use of an a manually openable loop type fastener to extend through such an aperture and secure the strap to a separate object. In lieu of the illustrated attaching straps, other flexible attaching retainers may be used such as cord, tape, monofilament plastic member or other flexible elongated plastic retainer members.

The straps 14 and 14' are each at least twice the length of the unfurled device and of sufficient length to wrap around the folded device several times to retain the device in its folded configuration and/or for stowage of the strap when the strap is not unwound. The wiping device may be unfurled with the strap 14' retained thereon by the fasteners 51 so the device may be used with the wiping device a foot or more from the ring 52 without detaching the free apertured or ringed end thereof from the user's apparel or other object to which the ring 52 is attached. When the strap is unwrapped, the snap fasteners 51 provide an emergency break-away safety release of the device from the strap 14' in the event the device inadvertently gets caught and is forcefully moved away from the ring 52 during activities of the user. Since the device can be kept furled by the hook/loop fasteners 20a and 20b as in FIGS. 10, 11 and 14, the fasteners 51 give the user the option of dispensing with use of the strap 14' if the device is to be merely kept in the user's pocket. Although the strap end 15 overlies the elastic strip 54 near the fasteners 51 as seen in FIG. 14, the strap is readily moved aside by a finger entering beneath the distensible central portion of strip 54.

In FIG. 14 the folding of the device provides means whereby the protective layer completely encloses the wiping layer. This folding comprises two initial parallel folds which reduce the area of the rectangular unfurled device by half, two additional parallel folds perpendicular to the two initial folds which again reduce the area of the folded device by half, and at least another folding or furling further reduces the area of the outer faces of the folded device to not more than one eighth of its original area.

The cleansing surface 13, which is inside and unexposed when the wiping device 10 is carried in its compact configuration, is made of soft baby flannel, chamois-like or other porous absorbent or wettable material which is lint free and non-abrasive when contacting any lens material or coatings. This inner surface material may be treated or impregnated with cleansing, defogging, protective or other materials to clean the lenses and/or leave desired film-like coatings thereon and to help retain dirt particles in pores or fibers of the surface material. The outer surface 12 is a waterproof or water resistant protective surface forming essentially the entire exposed outer surface of the device when the device 10 is retained in its compact configuration. The outer protective surface may be a separate layer stitched or otherwise secured to the material of the inner surface or may be a coating on the outside of the cleansing surface material.

The preferred embodiment uses a separate distinct layer of protective material and at least one other separate essentially coextensive wiping layer. The layers are stitched together at the periphery of the device 10 and a protective non-absorbent binding tape may enclose the stitched seam. However, it is possible to achieve some of the objects of this invention by using an adhesively laminated or double-surfaced device or a single flat layer having on one face a soft wiping surface and on the other face a protective surface such as one that has a surface treatment to make it at least water-resistant.

Although the preferred embodiment is a wiping device which has a relatively flat flexible configuration when folded, it is within the spirit of the invention to provide any compact flexible configuration in which the wiping layer is rolled, furled or otherwise closely or huggingly completely enwrapped by the protective layer. The bends of folds in the layers of the device are preferably formed without creasing the wiping layer so that it will have a smooth wiping surface during use.

Other variations within the scope of this invention will be apparent from the described embodiments and it is intended that the present descriptions be illustrative of the inventive features encompassed by the appended claims.

What is claimed:

1. A folded wiping device for wiping lenses of eyewear for sports activities, said device having multiple layers of flexible material in a flat folded configuration which can be unfolded to present two outer principal surfaces, said layers being coextensive and secured together at their peripheries to define said outer principal surfaces, said layers being similarly folded in said flat folded configuration, one of such surfaces being formed by a first layer of soft porous absorbent non-abrasive material suitable for non-abrasively wiping lenses of eyewear for sports activities, the other of such surfaces being formed by a second layer of material forming a protective enclosure for and providing physical protection for the first layer when the device is in its folded configuration, and manually releasable fastening means secured to said device to keep the device in its folded configuration and to prevent inadvertent unfolding when the device is not being used for wiping.

2. An eyewear lens wiping device according to claim 1 wherein said manually releasable fastening means is an integral part of the device.

3. An eyewear lens wiping device according to claim 1 wherein said manually releasable fastening means includes a strap having one end fixed to said device, said strap having a portion wrapped completely around the device in its folded configuration and releasably secured to the device to keep the device folded.

4. An eyewear lens wiping device according to claim 3 wherein said strap has a second end spaced beyond said portion with said second end of said strap having means for detachably fastening it to an external portion of a separate object.

5. An eyewear lens wiping device according to claim 4 wherein the second end of said strap has means providing an aperture to facilitate detachably fastening it to an external portion of a sporting garment.

6. An eyewear lens wiping device according to claim 1 wherein said manually releasable fastening means comprises separate hook and loop fastener members which are so located on the device that they can be pressed together to keep the device folded, said fastener members being releasable by manually forcing them apart to enable the device to be unfolded to expose said first layer.

7. An eyewear lens wiping device according to claim 6 wherein said device includes a strap means to enable the folded device to be fastened to an external portion of a separate object spaced from the folded configuration of the device for carrying the device when it is not in use for wiping.

8. An eyewear lens wiping device according to claim 1 wherein said device is rectangular in shape when unfolded and is folded to reduce its size by half three successive times to achieve its folded configuration which has opposite outer faces formed by said protective layer which are each one eighth the areal size of said rectangular unfolded shape.

9. An eyewear lens wiping device according to claim 8 wherein said manually releasable fastening means includes a strap having a first portion wrapped around the folded device, and further including a strap means extending from the first portion wrapped around the folded device and having manually releasable fastening means for fastening the strap means to an external portion of a garment.

10. An eyewear lens wiping device according to claim 1 wherein said device is rectangular in shape when unfolded and is folded to reduce its size by half at least two successive times followed by further folding to achieve its folded configuration which has opposite outer faces formed by said protective layer which are not more than one eighth the areal size of said rectangular unfolded shape.

11. A wiping device comprising a first sheet of soft porous absorbent non-abrasive material suitable for non-abrasively wiping lenses of eyewear for sports activities and a second sheet of protective material, said sheets being coextensive and secured together at their peripheries to present an outer wiping surface of the first sheet and an outer protecting surface of the second sheet, said sheets being wrappable to a compact pocket-size wrapped configuration in which said first sheet forms several overlying layers in said compact configuration, said second sheet being wrapped in said compact wrapped configuration closely about the outside of the first sheet whereby in said compact wrapped configuration the second sheet forms an enclosure protecting the first sheet from environmental contamination, and manually releasable fastening means for retaining said first and second sheets closely wrapped when the sheets are in said compact wrapped configuration.

12. A wiping device according to claim 11 wherein in said wrapped configuration the periphery and wiping surface portion of said first sheet are protected by said second sheet.

13. A wiping device according to claim 11 wherein said device includes an elongated flexible retainer means for attaching said device in its compact wrapped configuration to a separate object for carrying the device on the exterior of the object.

14. A wiping device according to claim 11 wherein said manually releasable fastening means includes an extension in the form of an elongated flexible retainer means for attaching said device in its compact wrapped configuration to a separate object for carrying the device on the exterior of the object.

15. A wiping device according to claim 13 wherein said flexible retainer means includes a break-away fastener to provide an emergency safety release of the device from said object when the device is inadvertently caught and forcefully moved away from the object.

16. A wiping device according to claim 13 wherein said flexible retainer means includes separable fastener means to provide the user with the option of dispensing with use of the elongated flexible retainer means when the device is to be kept in a pocket when'not used for wiping.

17. A flexible device for wiping a lens of eyewear for sports activities, said device having a folded configuration and being of a size to be readily carried in a pocket of sportswear clothing, said wiping device when unfolded having two coextensive exposed outwardly facing surfaces, said surfaces being similarly folded when the wiper device is in its folded configuration, a first of said surfaces being of a soft porous absorbent non-abrasive material suitable for non-abrasively wiping said lens, the second of said surfaces completely enclosing said first surface when the device is in its folded configuration to protect the entire first surface against environmental conditions which could impair its capability of cleanly wiping the lens, manually releasable fastening means secured to said second surface for retaining said device in its folded configuration when the device is carried by a user to prevent inadvertent unfolding during sporting activities of the user.

18. An eyewear lens wiping device according to claim 17 wherein said device includes manually releasable means for attaching the device to sportswear clothing comprising a strap extending from said device when the latter is retained in its folded configuration.

19. An eyewear lens wiping device according to claim 17 wherein said manually releasable fastening means includes a strap having a portion wrapped completely around said device to retain it in its folded configuration, and further includes means for anchoring opposite ends of said strap portion to keep said strap portion wrapped on said device.

20. An eyewear lens wiping device according to claim 13 wherein said first surface is part of a first distinct layer of soft material and said second surface is part of a second distinct layer of protective material which is coextensive with said first layer when the device is unfolded, said layers being similarly folded when the wiper device is in its folded configuration.

21. An eyewear lens wiping device according to claim 17 wherein said device is rectangular when unfolded and said surfaces are formed by coextensive first and second layers of flexible material, said protective surface layer being at least partially divided and having means to form with said wiping surface layer finger receiving pockets having pocket openings whereby the thumb and at least one of the other fingers of one hand of a user of the device can be inserted into respective pockets to wrap the wiping surface of the device around an edge of the lens to engage the wiping surface layer with opposite faces of the lens and to press the wiping surface layer against said opposite lens faces to wipe the lens using finger pressure.

22. An eyewear lens wiping device according to claim 17 wherein said device has means defining at least one set of multiple spaced finger engageable means at said protective surface for receiving the thumb and at least one of the other fingers of one hand of a user to enable the user to use a hand to press spaced wiping surface portions against opposite sides of a lens during a wiping action on the lens.

23. An eyewear lens wiping device according to claim 22 wherein said device is rectangular in shape when unfolded and has at least one such set with two spaced finger engageable means thereof located respectively near diagonally opposite corners of said rectangular shape.

24. An eyewear lens wiping device according to claim 17 wherein the folded configuration of the device is achieved by multiple folds in orthogonally related directions of an unfolded device to substantially reduce the exposed surface area of the device when in said folded configuration compared to the exposed surface area of the device when completely unfolded.

25. An eyewear lens wiping device according to claim 17 wherein said device is rectangular when unfolded and said surfaces are formed by coextensive first and second layers of flexible material, said protective surface layer having means for positive manual engagement with the thumb and at least one of the other fingers of one hand of a user of the device to wrap the wiping surface of the device around an edge of the lens to engage the wiping surface layer with opposite faces of the lens and to press the wiping surface layer against said opposite lens faces to wipe the lens using manual pressure.

* * * * *